Patented Aug. 21, 1951

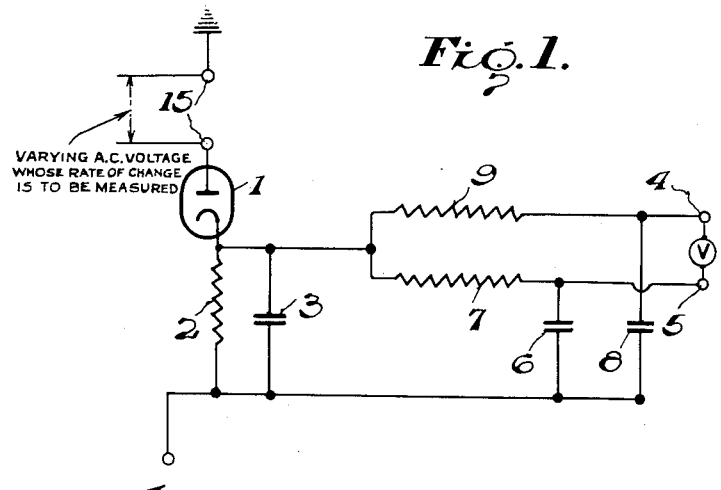
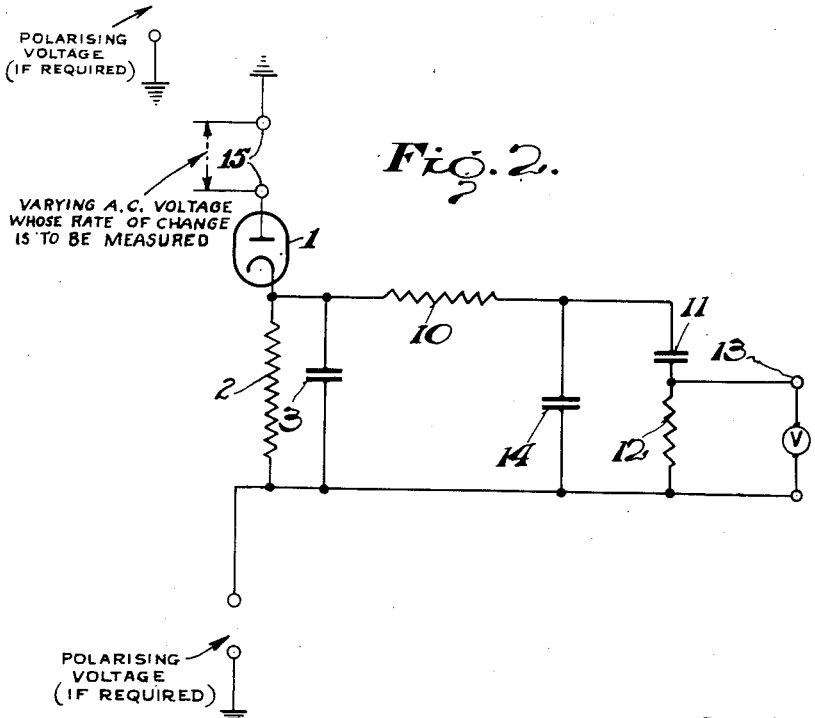

2,564,829

UNITED STATES PATENT OFFICE 2,564,829

ELECTRICAL APPARATUS FOR MEASURING THE RATE OF CHANGE OF AN INPUT VOLTAGE

Leslie Herbert Bedford, London, and John Bell and Eric Miles Langham, Teddington, England, assignors to A. C. Cossor Limited, London, England, a British company Original application November 30, 1943, Serial No. 512,402. Divided and this application July 26, 1946, Serial No. 686,479. In Great Britain November 30, 1942

7 Claims. (Cl. 171—95)

This invention relates to an electrical circuit for measuring the rate of change of a varying voltage over a period of time. The measurement obtained by the use of the invention is a weighted average value of the rate of change, in which the later values of the rate of change are given greater significance.

The circuit according to the invention, for measuring the rate of change of a varying direct voltage, comprises a pair of condensers each arranged to be charged from said input voltage through resistance, said condensers and resistances being so related that the charging time constants of said condensers are different and means to measure the difference between the voltages across said condensers.

In the preferred arrangement, one of said condensers is connected in series with a resistance across the other of said condensers which in turn is connected in series with another resistance across said varying direct input voltage.

If the circuit is to be applied to the measurement of the rate of change of amplitude of an alternating voltage, this is first rectified. If the amplitude is liable to pass through zero, however, an alternating voltage of the same phase and of constant amplitude must be superposed to prevent this, owing to the inability of the rectifier to give sense indication.

In the accompanying drawing, Figure 1 is a diagram of a circuit arranged for measuring, in accordance with the invention, the rate of change of the amplitude of an alternating voltage applied between input terminal 15 and earth. This may, for example, be an amplitude-modulated 50-cycle voltage.

The voltage between terminal 15 and earth is rectified by diode 1, so that a direct voltage proportional to its amplitude is developed across diode load 2 and condenser 3. This direct voltage is applied to two circuits of different time constants, in parallel with each other and comprising respectively condenser 6 in series with resistance 7 and condenser 8 in series with resistance 9. In a typical example, the resistances 7 and 9 may each have the value 1 megohm while the condensers 6 and 8 have respectively the values 4 microfarads and 8 microfarads. If the amplitude of the applied voltage varies linearly for a period of time, the difference between the direct voltages built up across the condensers 6 and 8 of the time constant circuits represents, after a time interval, the value of the rate of change of amplitude. This difference voltage is developed as a direct output voltage between terminals 4 and 5, neither of which is earthed. The voltage may be measured by any currentless direct voltage voltmeter. An apparatus such as that described in patent application Serial No. 686,478, may be used for this purpose.

Figure 2 is a fragmentary diagram showing an alternative arrangement of the time constant circuits of Figure 1, which has the advantage that one side of the output voltage representing the rate of change is earthed and that inaccuracies due to leakage are minimised. In the arrangement of Figure 2, resistance 10 is common to both time constant circuits, while resistance 12 is included in the circuit of condenser 11 only. The difference between the voltages developed across condensers 14 and 11, which is a measure of the value of the rate of change, appears between terminals 13 and earth. In a typical example, the values of resistances 10 and 12 may be 0.27 and 1.0 megohm respectively, while the values of condensers 14 and 11 may both be 2 microfarads. Since the charging time constant of each condenser is represented by the product of the condenser capacity and the resistance in series with it through which it is charged by the input voltage, the foregoing values give charging time constants for the circuits of condensers 14 and 11 of .54 and 2.54, respectively; i. e., the charging time constant of condenser 14 is $$R_{10}C_{14} = \frac{.27 \times 10^6 \times 2}{10^6} = .54$$

while the charging time constant of condenser 11 is $$(R_{10} + R_{12})C_{12} = \frac{(.27 + 1)10^6 \times 2}{10^6} = 2.54$$

It will be found that, if the amplitude of the alternating voltage applied at terminal 15, after being constant for a while, begins to change at a steady rate, the magnitude of the voltage between terminal 13 and earth will represent the rate of change with an accuracy within 1% after 30 seconds from the beginning of the change.

Although the time constant circuits are shown in Figures 1 and 2 as earthed at their lower ends, the circuits will function satisfactorily if, instead, the line shown as earthed is maintained at any constant amplitude alternating potential to earth in phase with that of terminal 15.

If the amplitude of the alternating voltage input at terminal 15 relative to earth is liable to pass through zero, the system fails owing to the inability of the rectifier to give sense indication. This difficulty is overcome by superposing upon the varying alternating voltage, the rate of change of amplitude of which is to be measured, an alternating voltage having the same phase and having a constant amplitude greater than the maximum amplitude of said varying alternating voltage. This may be applied between earth and the line shown as earthed in Figures 1 and 2.

It will be observed that the voltage, the rate of change of which is measured, is actually the varying direct voltage established across the diode load 2. The upper end of this load, connected to the cathode of the diode, is a point at high D. C. resistance to earth, but the lower end, even if it be connected to an alternating supply line, is at low D. C. resistance to earth. The advantages of the arrangement of Figure 2 are attained in all cases where one side only of the direct voltage is at low D. C. resistance to earth and the junction of condenser 14 and resistance 12 is connected to this side.

This application is a division of application Serial No. 512,402, filed November 30, 1943.

We claim:

1. An electrical measuring apparatus including a load, means for producing a varying direct input voltage across said load, and a circuit for measuring the rate of change of the amplitude of said input voltage, said circuit comprising a first resistance and a first condenser connected in series with one another and in parallel with said load, a second resistance and a second condenser in series with one another and with said first resistance but in parallel with said first condenser, and a voltage measuring means connected across said second resistance.

2. An electrical measuring apparatus according to claim 1 including means providing a low direct current resistance path between one side of said load and earth, and wherein said resistances and condensers are so arranged that the junction between said first condenser and said second resistance is connected to the side of said load having said low direct current resistance path to earth.

3. An electrical measuring apparatus according to claim 1 including a rectifier for deriving said varying direct input voltage from an alternating voltage of varying amplitude, the rate of change of amplitude of which is to be measured, and means for superposing on said alternating voltage of varying amplitude an alternating voltage of the same phase and of constant amplitude greater than the maximum amplitude of said varying alternating voltage in order to prevent the voltage across said rectifier from falling to zero.

4. An electrical measuring apparatus including a load, means for producing a varying direct input voltage across said load, and a circuit for measuring the rate of change of the amplitude of said input voltage, said circuit comprising a first resistance and a first condenser in series with one another and so connected to said load that said first condenser is charged by said input voltage through said first resistance, a circuit loop in parallel with said first condenser and in series with said first resistance comprising a second resistance and a second condenser in series with one another, the values of said resistances and condensers being so related that the charging time constants of said first and second condensers are different, and means for measuring the voltage drop across said second resistance, said voltage drop representing a weighted average value of the rate of change of the amplitude of said input voltage.

5. An electrical measuring apparatus according to claim 4 wherein said first and second condensers are of equal capacity.

6. An electrical measuring apparatus according to claim 5 wherein the capacity of each of said first and second condensers is 2 microfarads and the resistances of said first and second resistances are .27 megohm and 1.0 megohm, respectively.

7. An electrical measuring apparatus according to claim 4 wherein the ratio between the charging time constants of said first and second condensers, each of which is represented by the product of the condenser capacity and the resistance in series with it through which it is charged by said input voltage, is substantially .54 to 2.54.

LESLIE HERBERT BEDFORD.
JOHN BELL.
ERIC MILES LANGHAM.

REFERENCES CITED

The following references are of record in the file of this patent:

UNITED STATES PATENTS

| Number | Name | Date |
|---|---|---|
| 2,272,849 | Perkins | Feb. 10, 1942 |
| 2,375,775 | Evjen | May 15, 1945 |